United States Patent [19]

Imhof et al.

[11] Patent Number: 5,085,956

[45] Date of Patent: Feb. 4, 1992

[54] FIBER-STRUCTURE ELECTRODE SUPPORT WITH WELDED-ON CURRENT DISCHARGE LUG AND PRODUCTION METHOD THEREFOR

[75] Inventors: Otwin Imhof, Nürtingen; Holger Kistrup, Esslingen, both of Fed. Rep. of Germany

[73] Assignee: Deutsch Automobilgesellschaft, Fed. Rep. of Germany

[21] Appl. No.: 599,983

[22] Filed: Oct. 19, 1990

[30] Foreign Application Priority Data

Oct. 24, 1989 [DE] Fed. Rep. of Germany ....... 3935368

[51] Int. Cl.⁵ .............................................. H01M 4/64
[52] U.S. Cl. ..................... 429/211; 429/235; 29/623.1
[58] Field of Search ............... 429/211, 234, 235; 29/623.1; 219/6.5, 50, 78.01

[56] References Cited

U.S. PATENT DOCUMENTS

| | | | |
|---|---|---|---|
| 3,600,227 | 8/1971 | Hardman | 204/56.1 |
| 3,679,482 | 7/1972 | Hardman | 429/235 X |
| 4,161,569 | 7/1979 | Faber | 429/234 |
| 4,250,235 | 2/1981 | DuPont et al. | 429/241 |
| 4,447,509 | 5/1984 | Maskalick | 429/235 |

Primary Examiner—Anthony Skapars
Attorney, Agent, or Firm—Evenson, Wands, Edwards, Lenahan and McKeown

[57] ABSTRACT

A fiber-structure electrode support of metallized synthetic fibers with reinforced border and with welded-on, thin current discharge lug is produced by a method in which, after the welding operation, the previously straight current discharge lug having a rectangular cross-section is impressed in a first zone in parallel and strongly into the fiber-structure electrode support. This region is adjoined by a second zone, where the current discharge lug rises at an inclination of 10° to 30° with respect to the first zone running parallel to the lower side of the fiber-structure electrode support, so that the border of the current discharge lug runs out in three directions to the right, downwards and to the left, starting from the surface of the current discharge lug which overlaps the fiber-structure electrode support, in a gradual trasition. At this border 20% to 30% of the current discharge lug is pressed into the fiber-structure electrode support and welded. The run-out of the current discharge lug continues in the three directions after the end of the current discharge lug in the fiber-structure electrode support without any step, until the natural height of the surface of the fiber structure is reached.

4 Claims, 2 Drawing Sheets

FIBER-STRUCTURE ELECTRODE SUPPORT WITH WELDED-ON CURRENT DISCHARGE LUG AND PRODUCTION METHOD THEREFOR

BACKGROUND AND SUMMARY OF THE INVENTION

The present invention relates to a fiber-structure electrode support of metallized synthetic fibers with a welded-on, thin current discharge lug, and, in particular, to an electrode support for cells able to take high loads, and to a method for its production.

Owing to their high porosity, metallized fiber elements are particularly well-suited as electrode supports. Since the support elements produced do not require any metal carrier, such as an expanded metal section or a perforated plate, because of their good intrinsic stability and of their good current conduction, the current discharge lug has to be connected directly to the support element.

For the connection of fiber-structure electrode supports of metallized synthetic fibers, for example of nickelized polyolefin felt or nonwoven, to the current discharge lug, it is known to slit the border of the electrode support, insert the current discharge lug into this slit and subsequently weld the electrode support to the current discharge lug. Production of the connection of the fiber-structure electrode support to the current discharge lug in this way is very expensive and is therefore only practiced on a small scale.

For the connection of fiber-structure electrode supports of metallized synthetic fibers, it is also known to weld the border of the fiber-structure electrode support to the current discharge lug. In this case, the border has been reinforced by an electro-deposited metal covering as disclosed in German Patent No. 3,142,091. For reasons of electrical conductivity, the current discharge lug is relatively thick, about 1 mm to 1.5 mm, since the fiber-structure electrodes have a high capacitance per unit area (thickness of the electrodes from 1.5 mm to 8 mm) as well as very high current loading. The welding of the current discharge lug to the border of the fiber-structure electrode support is performed by resistance welding. For this purpose, the fiber-structure electrode support is placed on the current discharge lug and welded to the latter under pressure, and the lower edge of the current discharge lug is pressed into the metallized fiber-structure electrode support. As a result, there is a strong pressing of the metallized fiber-structure electrode support beyond the reinforced border. This causes cracks in the metallized fiber-structure electrode support in the region of the welding, and the bearing cross-section of the support is greatly reduced in this zone. All of this results in a low strength of the welded connection, so that high numbers of rejects due to current discharge lugs breaking off occur in the subsequent processing steps for electrode production, such as for example impregnating, welding of piles of plates, separating and forming.

Furthermore, it is known that the capacitance and loadability of finished cells suffer if, once the cells have been put into operation, individual electrode plates have an inadequate welded connection which does not withstand the forces occurring especially if the loading alternates. It is also known for the connection of fiber-structure electrode supports of metallized synthetic fibers, with reinforced border and with welded-on current discharge lug, that either the current discharge lug is provided on the edge adjacent to the fiber support with a bevel which runs out essentially without any steps and forms an angle of 10° to 50° with the lug, in which case the fiber support is compressed in the region of the weld and, starting from the weld, runs out on both sides more or less continuously to the full thickness and the fiber-structure electrode support having a thickness of 1.5 mm to 8 mm as disclosed in German Patent No. 3,632,352.

Alternatively, the current discharge lug is provided on the side adjacent to the fiber support with one or more steps, by means of which the fiber-structure electrode support is connected to the current discharge lug in such a way that the reinforced border of the electrode support is within a region of which the limits lay at a distance of twice the current lug thickness on either side of the edge of the step and the fiber-structure electrode support compressed in the stepped region reaching the full thickness continuously by about the end of the step and that the edge of the step is rounded off as disclosed in German Patent No. 3,632,351.

In alkaline, conventional heavy-duty batteries, the carriers of the active mass are nickel sintered plates. By sintering a loose fill of nickel powder onto a substrate comprising a mesh, expanded metal section or perforated plate, a compact metal substrate is obtained, which offers a good support for the connection to discharge lugs by spot welding. Such substrates are described for positive electrodes and for negative electrodes in U.S. Pat. Nos. 4,250,235 and 4,477,546. The connections with such substrate withstand high specific loads which result from the small connecting areas and the high loading requirements.

German Patent No. 3,026,778 describes an electrode in which the lug has serrated projections which penetrate the support, and the current discharge element is connected to the support by an electrolytic metal deposition. Furthermore, U.S. Pat. No. 3,600,227 mentions nickel-fiber support plates having 90% porosity, which are compacted at the edge and connected to a nickel lug by spot welding.

German Patent No. 3,734,131 describes a current discharge lug which is divided at least into three tongues which are bent alternatively on one side or both sides out of the plane of the lug and are pushed over a preferably compacted area of the fiber structure support and fastened to the latter by spot welding. The point of connection has a low resistance to tear-out force of 28 N, 87 N and 105 N. It is also known from resistance welding technology to use a shim in the form of an St plate section (4 mm by 14 mm by 1.0 mm) in order to accomplish a connection of the fiber-structure electrode support to a thin current discharge lug. In this case, owing to the complicated handling, first of all the plate section is tacked to the current discharge lug by spot welding. Only then could so-called "sandwich connections", with the current discharge lug laying between the fiber-structure electrode support and the plate-section shim, be established. Such a connection is not very suitable for the product to be produced, since the welded connection made in this way has only low strength values and, in addition, the chosen shim, which is however necessary here, is not permissible for the final product. Owing to their high porosity of usually over 75%, the fiber-structure electrodes are difficult to connect to the current discharge lugs, because the fiber structure of the electrode makes it difficult to anchor the compact, solid metal lug firmly. In addition, fiber-structure electrode supports of nickelized textile substrates often have proportions of electrically non-conductive fiber material, under certain circumstances exceeding the volume of nickel.

The measures mentioned are not sufficient for high transferable strengths of the connection of the current discharge lug to the fiber-structure electrode support or are too complex on account of the complicated shape of the current discharge lugs with their preparation by special tools and operations or on account of the high number of connections, necessary due to the small electrode surface, in relation to the capacitance for cells able to take extremely high loads, which may under certain circumstances even be intended for space travel.

The present invention has an object of providing a fiber-structure electrode support of metallized synthetic fibers with welded-on, thin current discharge lug and a method for its production. The cross-section of the fiber-structure electrode support outside the reinforced border is not constricted excessively. No cracking in the fiber-structure electrode support occurs around the welded connection. The fiber structure electrode support is not impressed before welding in the welding region. The current discharge lug does not have square or rectangular tongues formed by incisions or is otherwise mechanically pretreated. No auxiliary measures such as previously spot-attached plate sections in the case of a subsequent sandwich type of construction are necessary. The welded connection of the present invention has a high strength, not only under tensile loading, but also in the transverse direction. This connection thus permits the production of electrodes having favorable electrical contact resistances and high service lives, so that they can be used not only in open cells and, inter alia, in traction batteries, but also in closed maintenance-free cells, inter alia, in aerospace batteries, where the long mission times necessitate long service lives with best quality.

The foregoing objects have been achieved according to the present invention by pressing the current discharge lug into the fiber-structure electrode support such that a surface of parts of the current discharge lug most elevated are below the pressed surface of the fiber-structure electrode, and the current discharge lug is impressed strongly and parallel to the opposite fiber-structure electrode surface in a zone over-lapping the electrode. The strongly impressed zone of the current discharge lug is adjoined by a second zone of the current discharge lug, in which the lug rises with an inclination of 10° to 30° in relation to a lower side of the fiber-structure electrode in the direction of an upper side of the fiber-structure electrode, with a gradual, kinkless transition between the first zone and the second zone. An entire periphery of a border of the current discharge lug surrounding the second zone is applied without any kinks, the end edge of the flanged-on border of the current discharge lug laying flush with the pressed surface of the fiber-structure electrode around the entire periphery and the pressed region surrounding the current discharge lug passing without any kinks into the normal thickness of the fiber-structure electrode.

As far as the method of the present invention is concerned, the objects have been achieved by providing that, before the welding operation, the current discharge lug overlaps the fiber-structure electrode support by 2 to 5 mm, in that, during welding of the fiber-structure electrode support to the current discharge lug, the current discharge lug is pressed into the fiber-structure electrode support in such a way that the most elevated parts of the current discharge lug are, after the welding operation, arranged below the surface of the fiber-structure electrode. The upper welding electrode of the welding apparatus projects beyond the not-yet-pressed border of the fiber-structure electrode support to such an extent that, during the welding operation, the welding electrode forces the forward-swelling, flowable material and proportions of the melt beyond the current discharge lug onto the material and prevents the material from at least one of arching up and swelling forward. The current discharge lug is impressed in the upper region, in which it overlaps the fiber-structure electrode support, strongly and in parallel in the lower surface of the electrode, and the fiber-structure electrode support is welded in a region between two limiting curves, one limiting curve being characterized by a force and current setting at the adhesion limit and the other limiting curve being characterized by force and current setting at the spatter limit, a good welding quality being achieved by a welding in the region between the adhesion limit and the spatter limit.

In particular, the thin metallic current discharge lug welded onto the fiber-structure electrode support normally has a rectangular cross-section. The edge of the border of the fiber-structure electrode support, which has a thickness of 0.3 mm to 4 mm, may be located within a range from 2 mm to 5 mm below the current discharge lug before the welding operation. This distance is preferably about 3 mm to 5 mm. If, on one hand, the fiber support is too far below the end of the current discharge lug, there is the risk after welding that the current discharge lug will protrude from the upper plane of the support. Electrodes with the connection of the fiber-structure electrode support to the current discharge lug welded in this way entail a high risk of short-circuiting occurring in the assembled cell. If, on the other hand, the fiber support is not far enough below the end of the current discharge lug, there is too small a welding zone between the fiber support and the current discharge lug.

When the welding electrodes are pressed on, the highest pressures occur in the zone of the reinforced border of the fiber support, which mechanically has a greater stability than the remainder of the electrode support. The welding is primarily performed in this region or zone, in which the welding electrode is most elevated and runs parallel to the lower surface of the fiber support and to the lower welding electrode.

The further shaping of the welding electrode adjacent to the current discharge lug permits the fiber-structure electrode support compressed in the parallel-running region subjected to the greatest pressure to reach 50% to 60% of the full thickness more or less continuously in the direction of the lower side of the current discharge lug by almost the end of the current discharge lug with the border of the current discharge lug running out to the left, downwards and to the right, starting from the surface of the current discharge lug which overlaps the fiber-structure electrode support, in a gradual, curved transition (radius) to about 70% to 80% of the full thickness of the fiber support. The run-out of the pressed-in and welded-in current discharge lug continues in the three above-mentioned directions beyond the border of the current discharge lug in the fiber-structure electrode support, without any step, until the natural height of the upper surface of the fiber structure has been reached.

It is achieved by the preferred shaping of the welding electrode adjacent to the current discharge lug that, by the end of the current discharge lug, the parallel-compressed fiber-structure electrode support is made to have more or less continuously 70% to 80% of the full thickness and, beyond that, the full thickness, again continuously and without steps, not only in the direction of the lower end of the current discharge lug, but also in the direction of the two sides of the current discharge lug which overlap the fiber-structure electrode support. As a result, the electrode support is also not constricted excessively at the end of the current discharge lug. Consequently, cracks and excessively small carrying cross-sections of the fiber support are avoided and stresses are substantially eliminated from the electrode support. This results in an improved mechanical stability of the welded connection under both tensile loading and flexural loading. It is also advantageous to round the corners of the current discharge lugs when punching them out before the welding operation. This is particularly favorable for thicker fiber-structure electrode supports, in particular those of a thickness of about 0.7 mm to 4 mm.

Metallized synthetic fiber supports, particularly felts, needle felts, nonwovens and the like, are used as electrode supports. The activation, metallization and electrodeposited reinforcing are carried out by the usual techniques, nickel or copper being used in particular as metal coating on the fibers. The plastic materials also suitable for textile fibers, for example polyolefins, polyamides, polyacrylonitrile, etc., can also be considered as material for the fibers, provided they are stable in relation to the electrolyte with which they come into contact after installation in the cell. The fiber-structure electrode supports are provided with a border reinforcement, preferably at the border on which the current discharge lug is to be attached, the reinforcement being achieved by a thicker metal coating on the fibers located there.

BRIEF DESCRIPTION OF THE DRAWINGS

These and other objects, features and advantages of the present invention will become more apparent from the following detailed description of a presently preferred embodiment of a fiber-structure electrode support with welded-on, thin current discharge lug when taken in conjunction with the accompanying drawings wherein.

DETAILED DESCRIPTION OF THE DRAWINGS

A fiber-structure electrode support plate 12, having, for exemplary purposes, the approximate dimensions 103 mm in height at the left side and 62 mm in width is bonded off-center. On the upper side of the plate 12, in the left-hand corner, there is the fastening of the current discharge lug 11 (a center line from the left-hand border at a distance of about 12 mm, width of the current discharge lug is about 14 mm, the overlap is about 4 mm to 5 mm). About 20 mm from the top left corner of the plate 12, a slope of 10° begins at the upper edge, so that on the righthand side there is a plate height of 95.5 mm from the bottom. The current discharge lug 11 has a thickness of 0.2 mm, and is made from nickel-plate strips having a height of about 24 mm, the corners of which are rounded-off with a radius of R=2 mm and which has a through-hole of 5.3 mm in diameter in its upper part at a distance of about 5 mm from the top. In the case of thin supports, the textile plate substrate is 110 $g/m^2$ and the nickel covering 100 mg $Ni/cm^2$, whereas in the case of thick supports the textile plate substrate is about 190 $g/m^2$ and the nickel covering is 150 mg $Ni/cm^2$. The porosity of the thin fiber-structure electrode before welding is 82% if of a thickness of 1.2 mm and the porosity of the thick fiber-structure electrode before welding is 84% if of a thickness of 2.1 mm.

Figure 1:
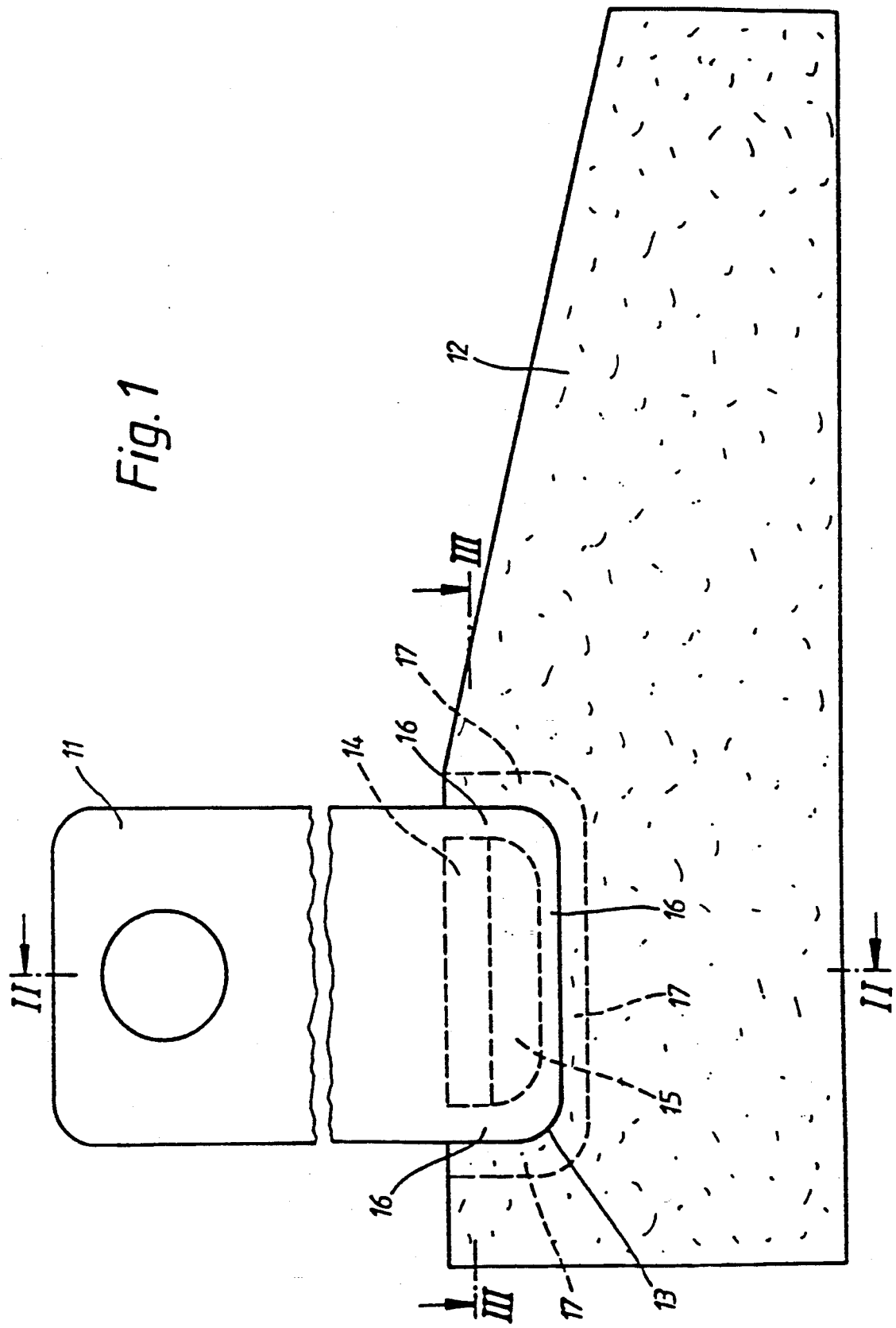
FIG. 1 is a schematic elevational front view of a connection of a fiber-structure electrode support to a thin current discharge lug (with a portion cut-away) after welding.

FIG. 1 shows the current discharge lug 11 and the fiber-structure electrode support 12 after the welding operation. Before the welding operation, the current discharge lug 11 was a rectangular, thin plate section with rounded edges 13 (R=2 mm) and positioned on the upper surface of the fiber-structure support 12 in such a way that there is an overlap of about 4 mm to 5 mm. The welding takes place essentially in the zone 14 indicated by dashed lines, in which an upper welding electrode parallel to the lower fiber-structure electrode support is designed to be most elevated. The greatest pressures and the highest welding currents occur in this zone 14, partly caused by the reinforced border of the support. This welding zone merges with the second zone 15, in which, after a gradual transition, the upper welding electrode slopes away from the support by 10° to 30°. The two first-described zones 14 and 15 are adjoined by a further zone 16, in which the upper welding electrode has a swung shape (radius). This zone 16 is formed at the three borders of the current discharge lug, to the left, downwards and to the right, which overlap the fiber-structure electrode support plate and is about 2 mm to 3 mm wide. However, it is also possible not to form this zone 16 with a radius but to allow the transition to progress constantly. Such a welding electrode with a constant transition is technically easier to produce and easier to rework in the event of wear. The uppermost border of the current discharge lug of the zone 16 is still pressed by 20% to 30% of the fiber-structure electrode support thickness from the upper fiber-structure electrode support surface into the fiber-structure electrode support. The zone 16 is adjoined by a further zone 17, starting from the three borders to the left, downwards and to the right of the current discharge lug 11, at which the fiber-structure electrode support reaches its full thickness more or less continuously. In the case of, for example, thin fiber-structure electrode supports of 1.2 mm in thickness, this zone 17 is in places less than 1 mm, but in the case of thick fiber-structure electrode supports of 2.1 mm in thickness it reaches, approximately, dimensions of the order of 2 mm.

Figure 2:
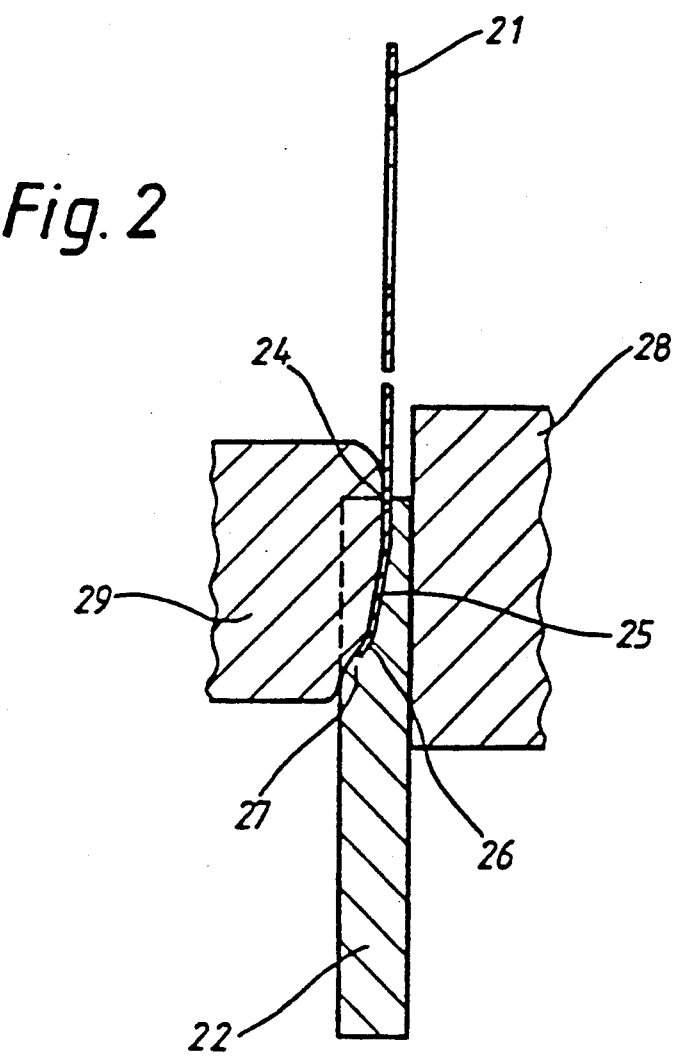
FIG. 2 is a sectional right side view along line II—II in FIG. 1.

FIG. 2 illustrates the situation just described in the side view from the right, indicated by the sectional line II—II in FIG. 1 and shows in turn the current discharge lug now designated by numeral 21 as well as the fiber-structure electrode support now designated by numeral 22 after the welding operation, with the strongly impressed zone 24 (zone 14 in FIG. 1), the adjoining inclined zone 25 (zone 15 in FIG. 1), the running-out zone 26 (zone 16 in FIG. 1) and the adjoining zone 27 (zone 17 in FIG. 1), which then only serves for pressing without an abrupt transition of the fiber-structure electrode support itself. In FIG. 2, the lower welding electrode 28, which is preferably straight and is made distinctly larger than the actual welding zone, and the upper welding electrode 29 with its contour are shown schematically in section.

Figure 3:
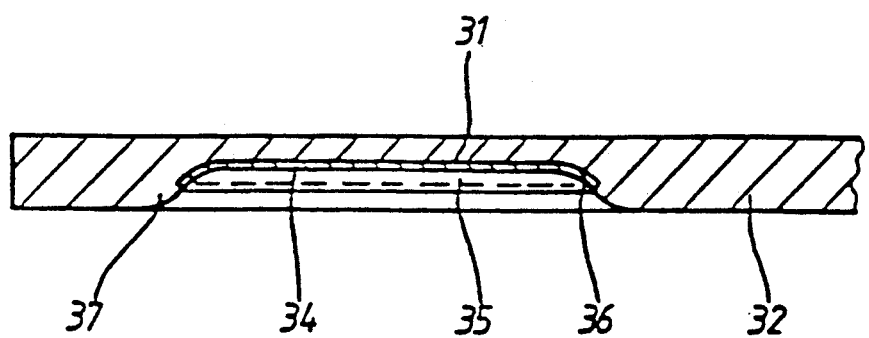
FIG. 3 is a plan sectional view along line III—III in FIG. 1.

FIG. 3 shows the welded connection of the current discharge lug 31 (11 in FIG. 1 and 21 in FIG. 2) with the fiber-structure electrode support 32 (12 in FIG. 1 and 22 in FIG. 2) with the four different zones 34 (zone 14), 35 (zone 15), 36 (zone 16) and 37 (zone 17) which differ in the degree to the extent which they are pressed into the fiber-structure electrode support and their respective different shaping.

The advantages achieved with the present invention are in particular that, with the individual zones which, in the welding zone, are pressed to various extents and subjected to various levels of loading due to the shape of the upper welding electrode, the strength of the connection is increased by over 60% in comparison with a conventional fiber-structure electrode support with a welded-on, thin current discharge lug. Due to the gradual transition from the strongly compressed part bearing the weld to the full thickness of the fiber-structure electrode support, the more metallized and thus particularly stable border of the fiber-structure electrode support is loaded the most and deformed by the welding. Smaller pressing forces are exerted on the adjoining zones and do not deform these zones as much, so that the deformation of the less metallized fiber-structure electrode support is less and tends towards zero. In addition, abrupt transitions do not occur in any section of the welding zone and the areas adjoining it. As a result, the breaking length (that change in length which gives the difference between the measured length $1_B$ upon breaking of the specimen and the original measured length $1_O$: (breaking length $1_R \times 1_B - 1_O$)) increases by over 200% with the fiber-structure electrode support of the present invention with welded-on, thin current discharge lug in the case of thicker fiber-structure electrode supports of approximately 2 mm in thickness in comparison with the conventional types of welding, in particular in comparison with the so-called "sandwich" connections. Consequently, the number of rejects in production also drops, and fewer quality assurance measures in manufacturer have to be taken in producing the fiber-structure electrode.

In addition, a larger proportion of manufacturing time is saved with the above-described fiber-structure electrode support with welded-on, thin current discharge lug because, first the support does not have to be impressed before welding; second, the current discharge lug does not have to be slit or serrated or pre-treated in some other way before welding; third, no plate section has to be spot-attached to the current discharge lug before the actual welding; and fourth, one welding operation suffices when carrying out welding and the welded connection does not have to be accomplished by a large number of weld points. Due to this considerable saving in manufacturing time, an increase in productivity is obtained. Due to the shorter manufacturing time, the considerable reduction in rejects and the creation of a very flexible connection of the fiber-structure electrode support to the welded-on, thin current discharge lug (acceptance of changes in length in excess of 5 mm in contrast to the maximum 1.5 mm of previously used connections), the fiber-structure electrode with welded-on, thin current discharge lug according to the present invention is not only suited for stationary applications, but is also optimally used in the case of traction cells and cells for space travel, with particularly specified vibration tests, in which some of the cell components are subjected to fifteen times the acceleration due to gravity, and more, under alternating loading.

In practice it has been found that a fiber-structure electrode support of the type according to the present invention with welded-on, thin current discharge lug (0.2 mm nickel plate) withstands a tearing force of 600 N to 700 N, with a breaking length of 5 to 6 mm, in a tensile test on a support having a thickness of 2.1 mm and withstands a tearing force of 400 N to 500 N, with a breaking length of 2 to 3 mm, in a tensile test on a support having a thickness of 1.2 mm.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A fiber-structure electrode of metallized synthetic fibers having a thickness of between 0.3 to 4 mm, with a welded-on, thin current discharge lug having a thickness of between about 0.1 and 0.6 mm pressed into the fiber-structure electrode support such that a surface of parts of the current discharge lug most elevated are below the pressed surface of the fiber-structure electrode, and the current discharge lug is impressed strongly and parallel to the opposite fiber-structure electrode surface in a zone over-lapping the electrode, the strongly impressed zone of the current discharge lug is adjoined by a second zone of the current discharge lug in which the lug rises with an inclination of 10° to 30° in relation to a lower side of the fiber-structure electrode in the direction of an upper side of the fiber-structure electrode, with a gradual, kinkless transition between the first zone and the second zone, and an entire periphery of a border of the current discharge lug surrounding the second zone being applied without any kinks, the end edge of the flanged-on border of the current discharge lug laying flush with the pressed surface of the fiber-structure electrode around the entire periphery and the pressed region surrounding the current discharge lug passing without any kinks into the normal thickness of the fiber-structure electrode.

2. The fiber-structure electrode according to claim 1, wherein the fiber-structure electrode support has a porosity of between about 70% to 98%.

3. Method of producing a fiber-structure electrode according to claim 1, comprising the steps of overlapping, before the welding operation, the current discharge lug the fiber-structure electrode support by 2 to 5 mm; pressing, during welding of the fiber-structure electrode support to the current discharge lug, the current discharge lug is into the fiber-structure electrode support in such a way that the most elevated parts of the current discharge lug are, after the welding operation, arranged below the surface of the fiber-structure electrode, the upper welding electrode of the welding apparatus projecting beyond the not-yet-pressed border of the fiber-structure electrode support to such an extent that, during the welding operation, the welding electrode forces the forward-swelling, flowable material and proportions of the melt beyond the current discharge lug onto the material and prevents the material from at least one of arching up and swelling forward, impressing the current discharge lug in the upper region, in which it overlaps the fiber-structure electrode support, strongly and in parallel in the lower surface of the electrode, and welding the fiber-structure electrode support in a region between two limiting curves, one limiting curve being characterized by a force and current setting at the adhesion limit and the other limiting curve being characterized by force and current setting at the spatter limit, a good welding quality being achieved by a welding in the region between the adhesion limit and the spatter limit.

4. Method according to claim 3, wherein the metallized fibers of the fiber-structure electrode support have a plastic core, and the step of welding includes vaporization and sucking away of the plastic core in the welding zone.

* * * * *